United States Patent [19]

Wald

[11] 4,330,294
[45] May 18, 1982

[54] ANTHRAQUINONE COMPOUNDS AND PROCESS FOR DYEING THEREWITH

[75] Inventor: Roland Wald, Huningue, France

[73] Assignee: Sandoz Ltd., Basel, Switzerland

[21] Appl. No.: 191,077

[22] Filed: Sep. 26, 1980

[30] Foreign Application Priority Data

Oct. 2, 1979 [CH] Switzerland .................. 8882/79

[51] Int. Cl.³ .................. C09B 1/34; D06P 1/20; D06P 1/40; D06P 3/87
[52] U.S. Cl. .................. 8/643; 8/676; 8/531; 260/374; 260/371
[58] Field of Search .................. 8/643, 676; 260/374; 8/531

[56] References Cited

U.S. PATENT DOCUMENTS

| | | | |
|---|---|---|---|
| 2,091,812 | 8/1937 | Haddock et al. | 260/374 |
| 2,342,191 | 2/1944 | Grossman | 8/643 |
| 3,420,856 | 1/1969 | Bengaeral | 8/676 |
| 3,646,071 | 2/1972 | Frey et al. | 260/371 |
| 3,779,701 | 12/1973 | Zenhausern et al. | 260/378 |
| 3,989,449 | 11/1976 | Dixon et al. | 8/643 |

FOREIGN PATENT DOCUMENTS

| | | | |
|---|---|---|---|
| 2328020 | 10/1975 | France . | |
| 4523835 | 9/1965 | Japan | 260/374 |
| 4573 | 9/1965 | Japan | 260/374 |

OTHER PUBLICATIONS

Colour Index, 3rd Edition, vol. 4, 1971, p. 4540.

*Primary Examiner*—Maria Parrish Tungol
*Attorney, Agent, or Firm*—Gerald D. Sharkin; Richard E. Vila; Thomas C. Doyle

[57] ABSTRACT

The present invention relates to compounds of formula

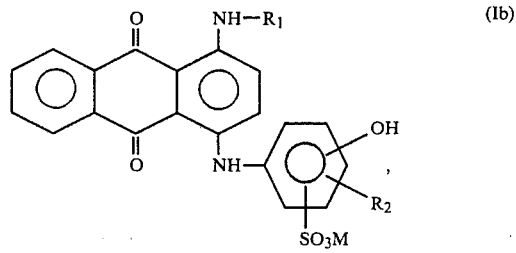

in which $R_1$ is an aliphatic or alicyclic hydrocarbon radical,
$R_2$ is hydrogen, halogen or $C_{1-8}$alkyl,
M is hydrogen or an equivalent of a non-chromophoric cation and mixtures of such compounds with the corresponding ethers, which mixtures are useful as anionic dyestuffs.

28 Claims, No Drawings

ANTHRAQUINONE COMPOUNDS AND PROCESS FOR DYEING THEREWITH

The present invention relates to 1-amino-4-phenylamino sulphonated anthraquinones and their use in dyeing anionic dyeable substrates.

Compounds of formula Ia,

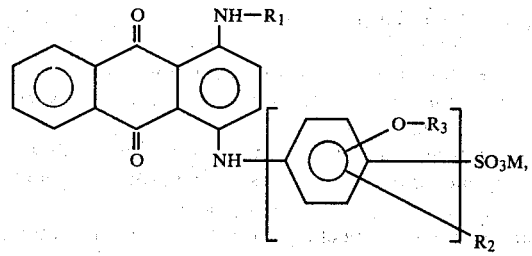

in which
$R_1$ is an aliphatic or alicyclic hydrocarbon radical,
$R_2$ is hydrogen, halogen or $C_{1-8}$alkyl,
$R_3$ is $C_{1-4}$alkyl, phenyl, chlorophenyl or tolyl, and
M is hydrogen or an equivalent of a non-chromophoric cation and the sulpho is bound to a benzene ring, are anionic dyestuffs useful for dyeing polyamides. These compounds may be employed for dyeing in an aqueous medium in which they, particularly in the salt form, are water-soluble. However, it has been observed that such compounds, especially where $R_1$ is a sec. alkyl or cycloalkyl containing 7 or more carbon atoms are adversely affected by salts and/or hard water. It has now been found that when such compounds are employed in admixture with compounds of formula Ib

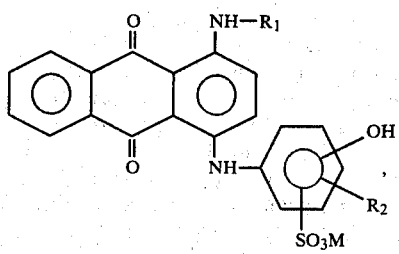

in which $R_1$, $R_2$ and M have the significances given above, the sensitivity to salts and hard water is reduced.

The compounds of formula Ia are either known, for example those described in U.S. Pat. No. 3,779,701 or may be prepared by analogous methods.

The present invention provides compounds of formula Ib as defined above and mixtures comprising at least one compound of formula Ia and at least one compound of formula Ib, the significances of $R_1$, $R_2$ and M in the compounds of formula Ia and Ib in such mixtures may be the same or different. Preferably, owing to ease of production, they are the same.

In the compounds of formula Ib or the mixtures of the invention the aliphatic or alicyclic radicals as $R_1$ preferably contain up to 18 carbon atoms. Preferably $R_1$ is $R_1'$, where $R_1'$ is primary, secondary or tertiary $C_{3-12}$alkyl or cyclohexyl which is optionally alkyl-substituted and contains a total of up to 12 carbon atoms. More preferred $R_1$ radicals are those in which the carbon atom attached to the nitrogen is a secondary carbon atom. More preferably, $R_1$ is $R_1''$, where $R_1''$ is optionally alkyl-substituted cyclohexyl with a total of up to 12 carbon atoms or sec. $C_{3-12}$alkyl, especially cyclohexyl and alkyl groups which contain from 6 to 9 carbon atoms. More preferably $R_1$ is $R_1'''$, where $R_1'''$ is mono- di- or trimethyl-substituted cyclohexyl, especially 3,3,5-trimethylcyclohexyl.

Preferred halogens as $R_2$ are chlorine and bromine. Preferably $R_2$ is $R_2'$, where $R_2'$ is hydrogen, $C_{1-4}$alkyl, chlorine or bromine. More preferably $R_2$ is $R_2''$, where $R_2''$ is hydrogen or $C_{1-4}$alkyl. Even more preferably $R_2$ is $R_2'''$, where $R_2'''$ is hydrogen, methyl or ethyl. Most preferably $R_2$ is hydrogen or methyl, especially hydrogen.

$R_3$ is preferably $R_3'$, where $R_3'$ is methyl, ethyl, phenyl, chlorophenyl or tolyl. More preferably $R_3$ is $R_3''$, where $R_3''$ is methyl or ethyl. When $R_3$ is phenyl, chlorophenyl or tolyl, the group —$OR_3$ is preferably para to the amino group.

The cations as M may be any non-chromophoric cation usual for anionic dyestuffs. Preferred cations are ammonium or alkali metal cations with the alkali metal cations, namely sodium, lithium or potassium, being most preferred.

Preferred compounds of formula Ib are those of formula Ib'.

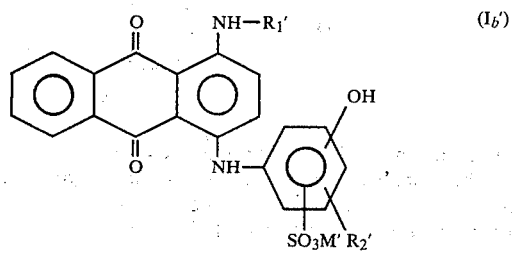

in which M' is an alkali metal cation; especially those in which $R_1'$ is $R_1''$ and in which the carbon atom of the $C_{3-12}$ alkyl bound to the nitrogen is a secondary carbon atom, with those in which such alkyl or cyclohexyl radical contains 6 to 9 carbon atoms being most preferred.

More preferred compounds of formula Ib are those of formula $I_b'''$,

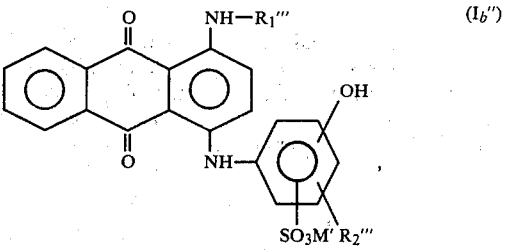

Most preferred compounds of formula Ib are those of formula $I_b''$ where $R_1''$ is 3,3,5-trimethylcyclohexyl especially those wherein $R_2'''$ is hydrogen.

The preferred mixtures of the invention are those in which the mol ratio of compound of formula Ib to compound of formula Ia is from 1:10 to 1:1 more preferably, from 1:1.5 to 1:4, with a mol ratio of about 1:2 being most preferred.

In the preferred mixtures of the invention the compounds of formula Ia are those in which $R_1$ is $R_1'$, $R_2$ is $R_2'$, preferably $R_2''$, $R_3$ is $R_3'$ and M is M', and the compounds of formula Ib are those of formula Ib', with those mixtures where each $R_1$, $R_2''$ and M' are the same, being most preferred.

More preferred mixtures are those in which in the compound of formula Ia, $R_1$ is $R_1'''$, $R_2$ is $R_2'''$, $R_3$ is $R_3'$ and the compound of formula Ib is one of formula $I_b'''$ and preferably each $R_1$, $R_2$ and M is the same, with those mixtures in which the mol ratios of the compounds of formula Ia and Ib are the preferred ratios given above being especially preferred.

A representative class of mixtures according to the invention is one where in the compound of formula Ia, the sec. alkyl or cycloalkyl as $R_1$ contain from 7 to 9 carbon atoms and/or $R_3$ is phenyl, chlorophenyl or tolyl and the radical $R_1$ in the compound of formula Ib is the same or different, preferably the same.

The present invention further provides a process for the production of a compound of formula Ib, as defined above, comprising sulphonating a compound of formula $II_b$,

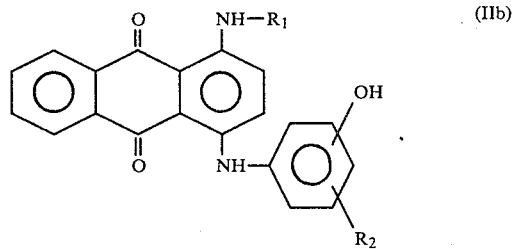

in accordance with known methods.

The compound of formula $II_b$ can be prepared in accordance with known methods, preferably by hydrolysing a compound of formula IIc,

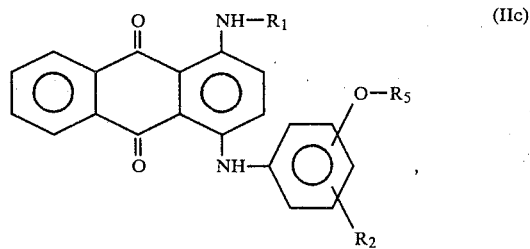

in which $R_5$ is $C_{1-4}$alkyl, in a sulphuric acid medium.

The mixtures according to the invention may be prepared by admixing the compounds of formula Ia and Ib or by sulphonating a mixture containing a compound of formula IIb and a compound of formula IIa,

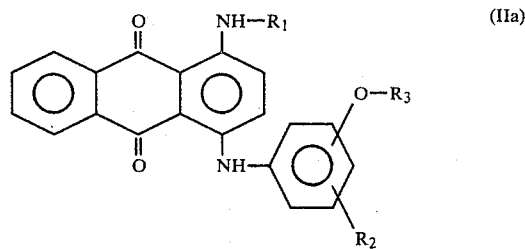

simultaneously.

The sulphonation of the compounds of formulae IIa and IIb may be carried out in the same vessel as the preparation of the compound of formula IIb by hydrolysing a compound of formula IIc. It will be appreciated that where the compound of formula Ia is one wherein $R_3$ is alkyl, the compound of formula IIc may be hydrolysed to the degree corresponding to the mol ratio of the compound of formula Ib desired in the mixture and the whole is then sulphonated.

As stated above sulphonation is carried out in accordance with known methods and it will be appreciated that when $R_3$ in the compound of formula IIa is phenyl, tolyl or chlorophenyl the sulphonation conditions should be chosen so as to avoid disulphonation.

The sulphonated products may be isolated in accordance with known methods.

The mixtures of the invention are useful for dyeing or printing anionic dyeable substrates, in particular textile substrates consisting of or comprising natural or synthetic polyamides, especially wool and nylon. The mixtures build-up on polyamide fibres from a weakly acid to neutral dyebath. Dyeing may be effected in accordance with known methods, for example exhaust dyeing, pad dyeing or printing. The mixtures may be admixed with blending agents, for example dextrin.

The mixtures according to the invention are less sensitive to salts and hard water than the compounds of formula Ia alone. This is an advantage when dyeing as hard water can be used. Furthermore, the mixtures are more stable in printing pastes or dye baths containing a large amount of salts such as those commonly employed i.e. ammonium sulphate, sodium sulphate and/or sodium-, lithium- or potassium-chloride. When dyes are sensitive to salts precipitation of the dyestuff in dye baths, stock solutions or printing pastes containing salts occurs and the same applies for dyebaths or stock solutions containing hard water. Thus, printing pastes and stock solutions may be prepared without the addition of special water-softening agents.

Owing to the reduced sensitivity to salts and/or hard water higher concentrations of the dye mixture may be employed in the dyebath as well as in printing pastes.

The mixtures according to the invention may also be used for dyeing in conjunction with other dyestuffs with similar anionic properties.

The following Examples further serve to illustrate the invention. In the Examples the parts are by weight and the temperatures in degree Centigrade.

EXAMPLE 1

10 Parts 1-cyclohexylamino-4-(4'-hydroxyphenylamino)-anthraquinone are dissolved in 50 parts 20% oleum at a temperature of 10°–12° and the mixture is stirred for 5 hours at 15°–20°. Afterwards the solution is poured onto a mixture consisting of ice and potassium chloride, the suspension is stirred for 1 hour, the obtained precipitate is filtered off and is washed with 15% aqueous potassium chloride. The dyestuff is pasted with water and is adjusted to a pH-value of 7 with an aqueous potassium hydroxide solution.

EXAMPLE 2

3 Parts 1-cyclohexylamino-4-(4'-hydroxyphenylamino)-anthraquinone are dissolved together with 7 parts 1-cyclohexylamino-4-(4'-ethoxyphenylamino)-anthraquinone in 50 parts 20% oleum at a temperature of 10°. The same method as described in Example 1 is employed. After isolation and drying at 100° a dyestuff comprising 30 mol-% of the compound of formula

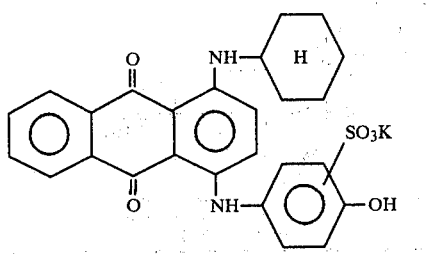

and 70 mol-% of the compound of formula

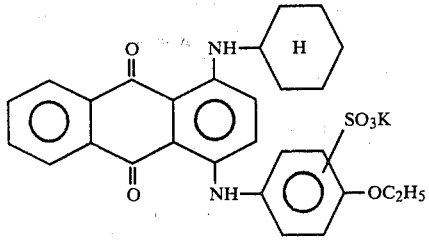

is obtained.

The dyestuff dyes textile substrates consisting of synthetic polyamides, e.g. nylon and wool, in blue-green shades having good wet- and light fastnesses. The dyestuff is well soluble in water; it has a good salt-compatability and is not sensitive to hard water.

EXAMPLE 3

5.5 Parts 1-(3',3',5'-trimethylcyclohexylamino)-4-(4'-ethoxyphenylamino)-anthraquinone are dissolved in 40 parts 98% sulphuric acid at 20°–26° and stirred until the ethoxy residue is completely hydrolysed. 25 Parts oleum (with 65% $SO_3$) are added dropwise at 14°–16°. Then 10.5 parts 1-(3',3',5'-trimethylcyclohexylamino)-4-(4'-ethoxyphenylamino)-anthraquinone are added and the whole is stirred for c. 10 to 12 hours at 25°–26°. The solution is poured onto 400 parts water and stirring is continued for one hour. The precipitated dyestuff is filtered off and is washed with a 7% potassium chloride solution. The dyestuff is pasted with water and is adjusted at a pH-value of 7 with sodium hydroxide solution and dried.

The dyestuff is well soluble in water; dyes wool and textile substrates consisting of synthetic polyamides from a neutral to weakly acid dye bath in even shades, giving dyeings having good light-, sweat-, wash- and milling fastnesses. The dye is salt-compatible and is not sensitive to hard water.

EXAMPLE 4

3.2 Parts 1-cyclohexylamino-4-(4'-methoxyphenylamino)-anthraquinone are dissolved in 40 parts 97% sulfuric acid at a temperature of 20°–28° and stirred until the methoxy residue is completely hydrolysed. 30 Parts oleum (with 65% $SO_3$) are added dropwise at 12°–15°. 12.8 Parts 1-cyclohexylamino-4-(4'-methoxyphenylamino)-anthraquinone are added and stirring is continued until the whole is sulfonated. The solution is poured onto 200 parts ice and 200 parts water. The resulting crystallized dyestuff is filtered off and is washed with a 8% sodium chloride solution. After neutralisation, analogous to Example 3, with LiOH, NaOH or KOH the corresponding Li-, Na- respectively K-salts can be obtained. The lithium, sodium or potassium salt of the dye obtained is well soluble in water and gives dyeings having good wet fastnesses.

EXAMPLE 5

6.4 Parts 1-cyclohexylamino-4-(4'-methoxyphenylamino)-anthraquinone are dissolved in 40 parts 97% sulphuric acid at 20°–28° and stirred until the methoxy residue is completely hydrolysed. 30 Parts oleum (with 65% $SO_3$) at 12°–15° are added dropwise. 9.6 Parts 1-cyclohexylamino-4-(4'-methoxyphenyl)-amino)anthraquinone are added and stirring is continued at 16° to 22° until sulphonation is complete. Isolation is effected according to the method of Example 4.

In the following Table further compounds of formula Ib are given and mixtures of the invention. The dye shade indicated in the last column is that obtained with mixtures of the compounds of formula Ib with compounds of formula Ia. The mixtures are obtained in analogy with the preceding Examples and depending on the amount of each unsulphonated compound which is sulphonated, the mixtures contain from 20–40 mol-% compound of formula Ib and 80–60 mol-% compound of formula Ia. The mixtures in salt form are well soluble in water, have good salt-compatability and are not sensitive to hard water.

| Ex. No. | $R_1$ | $R_2$ | $-O-R_3$ | position of $-OH$ | Dye shade on Wool or Nylon |
|---|---|---|---|---|---|
| 6 | CH₃–⟨H⟩ | H | 4-OC₂H₅ | 4 | blue-green |
| 7 | " | H | 4-OCH₃ | 4 | blue-green |
| 8 | " | H | 4-OCH₂CH₂CH₂CH₃ | 4 | blue-green |

-continued

Structures:

Left: Anthraquinone with O, NH-R$_1$ at position 1; O, NH-[phenyl ring with positions 1-6]-R$_2$, -O-R$_3$, -SO$_3$H Right (+): Anthraquinone with O, NH-R$_1$; O, NH-[phenyl ring 1-6]-R$_2$, -OH, -SO$_3$H

| Ex. No. | R$_1$ | R$_2$ | —O—R$_3$ | position of —OH | Dye shade on Wool or Nylon |
|---|---|---|---|---|---|
| 9 | " | H | 2-OCH$_3$ | 2 | green |
| 10 | " | H | 3-OCH$_3$ | 3 | blue-green |
| 11 | " | 5-CH$_3$ | 2-OCH$_3$ | 2 | green |
| 12–17 | —⟨H⟩—CH$_3$ | as Exs. 6 to 11 | as Examples 6 to 11 | as Exs. 6 to 11 | as Examples 6 to 11 |
| 18–23 | CH$_3$ CH$_3$ on ⟨H⟩ | as Exs. 6 to 11 | as Examples 6 to 11 | as Exs. 6 to 11 | as Examples 6 to 11 |
| 24–29 | CH$_3$—⟨H⟩—CH$_3$ with CH$_3$ | as Exs. 6 to 11 | as Examples 6 to 11 | as Exs. 6 to 11 | as Examples 6 to 11 |
| 30–33 | —⟨H⟩ | as Exs. 8 to 11 | as Examples 8 to 11 | as Exs. 8 to 11 | as Examples 8 to 11 |
| 34–38 | CH$_3$ CH$_3$ —⟨H⟩—CH$_3$ | as Exs. 7 to 11 | as Examples 7 to 11 | as Exs. 7 to 11 | as Examples 7 to 11 |
| 39–44 | —CH(CH$_3$)—CH$_2$—CH$_2$—CH$_2$—CH$_3$ | as Exs. 6 to 11 | as Examples 6 to 11 | as Exs. 6 to 11 | as Examples 6 to 11 |
| 45–50 | —CH(CH$_2$—CH(CH$_3$)$_2$)(CH$_2$—CH(CH$_3$)$_2$) | as Exs. 6 to 11 | as Examples 6 to 11 | as Exs. 6 to 11 | as Examples 6 to 11 |
| 51–56 | —CH(CH(CH$_3$)$_2$)(CH(CH$_3$)$_2$) | as Exs. 6 to 11 | as Examples 6 to 11 | as Exs. 6 to 11 | as Examples 6 to 11 |

APPLICATION EXAMPLE A

1 Part of the dyestuff produced in accordance with Example 2 is dissolved in 6000 parts of water at a temperature of 40° and 4 parts ammonium sulphate are added. 100 Parts of wool yarn are added and the dye bath is heated to the boiling point within 30 minutes and kept at boiling temperature for 1 hour. Finally the yarn is rinsed and dried. The fibres are fast dyed and have blue-green shades.

When yarn consisting of synthetic polyamides (Nylon 66) is dyed according to the above-described procedure, a good dyeing is also obtained.

APPLICATION EXAMPLE B

A printing paste is produced as follows:

390 Parts boiling water are poured onto 10 parts of the dyestuff produced according to Example 2, 40 parts dextrin, 40 parts thiodiethyleneglycol and 10 parts monobutyldiethyleneglycolether and stirred. The so-obtained solution is stirred into a mixture consisting of 450 parts 9% aqueous locus bean-gum thickener and 60 parts 50% aqueous ammonium sulphate. With this printing paste a wool yarn is printed according to usual methods. The printed fabric is subjected to saturated steam for 20–40 minutes at a temperature of 100°–102°, soaped at 50°–60°, rinsed cold and finally dried. A brilliant blue-green print with good fastnesses is obtained.

Polyamide-66-, Polyamide-6- or silk fabrics can be printed in analogous manner; here again brilliant blue-green prints with good wet fastnesses are obtained.

When replacing the dyestuff in the above-stated Application Examples A and B with the corresponding quantity of the mixtures of Examples 3 to 56, brilliant dyeings, respectively prints, are obtained in the shades mentioned in the corresponding examples.

What is claimed is:

1. A mixture comprising at least one compound of formula Ia

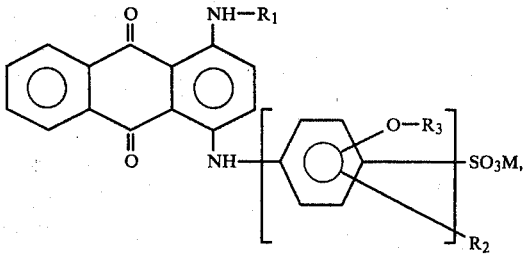

and at least one compound of formula Ib

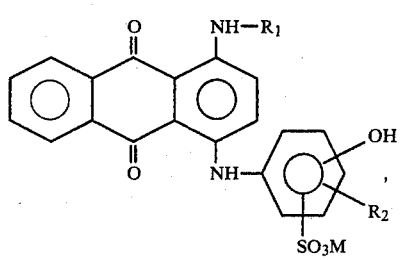

in which
each $R_1$ is an aliphatic or alicyclic hydrocarbon radical,
each $R_2$ is hydrogen, halogen or $C_{1-8}$alkyl,
$R_3$ is $C_{1-4}$alkyl, phenyl, chlorophenyl or tolyl,
each M is hydrogen or an equivalent of a non-chromophoric cation,
and the $R_1$'s, $R_2$'s and M's, respectively, are the same or different.

2. A mixture according to claim 1 wherein each $R_1$, independently, is $R_1''$ where $R_1''$ is cyclohexyl, alkylcyclohexyl containing a total of up to 12 carbon atoms, or secondary $C_{3-12}$-alkyl.

3. A mixture according to claim 1, in which each $R_1$ is $R_1'$, where $R_1'$ is primary, secondary or tertiary $C_{3-12}$alkyl or cyclohexyl which is optionally alkyl-substituted and contains a total of up to 12 carbon atoms.

4. A mixture according to claim 3, in which each $R_2$ is $R_2'$, where $R_2'$ is hydrogen, $C_{1-4}$alkyl, chlorine or bromine.

5. A mixture according to claim 4 in which each M is an alkali metal cation.

6. A mixture according to claim 4, wherein the mol ratio of compound of formula Ib to compound of formula Ia is from 1:10 to 1:1.

7. A mixture according to claim 5, in which each $R_1$ is $R_1''$, where $R_1''$ is cyclohexyl which is optionally substituted by alkyl and the total number of carbon atoms in such cyclohexyl is up to 12 or is sec. $C_{3-12}$alkyl in which the carbon atom attached to the nitrogen is a secondary carbon atom.

8. A mixture according to claim 7, in which each $R_2$ is $R_2''$, where $R_2''$ is hydrogen or $C_{1-4}$alkyl.

9. A mixture according to claim 8, in which each $R_1$ contains from 6 to 9 carbon atoms.

10. A mixture according to claim 9, in which each $R_1$ is $R_1'''$ where $R_1'''$ is mono-, di- or tri-methyl-substituted cyclohexyl.

11. A mixture according to claim 10, in which each $R_2$ is $R_2'''$, in which $R_2'''$ is hydrogen, methyl or ethyl.

12. A mixture according to claim 11 wherein the mol ratio of compound of formula Ib to compound of formula Ia is from 1:1.5 to 1:4.

13. A mixture according to claim 11 wherein each $R_1'''$ is 3,3,5-trimethylcyclohexyl, each $R_2'''$ is hydrogen or methyl and $R_3$ is $R_3''$ where $R_3''$ is methyl or ethyl.

14. A mixture according to claim 12 wherein $R_3$ is $R_3'$ wherein $R_3'$ is methyl, ethyl, phenyl, chlorophenyl or tolyl and M is M' where M' is an alkali metal cation and each $R_1$, $R_2$ and M is the same.

15. A mixture according to claim 14 wherein each $R_1$ is 3,3,5-trimethylcyclohexyl, each $R_2$ is hydrogen and $-OR_3$ is 4-ethoxy.

16. A mixture according to claim 1, in which each $R_2$, independently, is $R_2'$, where $R_2'$ is hydrogen, $C_{1-4}$alkyl, chlorine or bromine.

17. A mixture according to claim 1, in which $R_3$ is methyl, ethyl, phenyl, chlorophenyl or tolyl.

18. A mixture according to claim 1, in which each $R_2$, independently, is $R_2''$, where $R_2''$ is hydrogen or $C_{1-4}$alkyl.

19. A mixture according to claim 1, in which each $R_1$, independently, is $R_1'''$, where $R_1'''$ is mono- di- or trimethylsubstituted cyclohexyl.

20. A mixture according to claim 1, in which each $R_2$ independently, is $R_2'''$, where $R_2'''$ is hydrogen, methyl or ethyl.

21. A mixture according to claim 1, in which each M is an alkali metal cation.

22. A mixture according to claim 1, in which each $R_1$, $R_2$ and M is the same.

23. A mixture according to claim 1, in which the mol ratio of the compound of formula Ib to the compound of formula Ia is from 1:10 to 1:1.

24. A mixture according to claim 23, in which the mol ratio is from 1:1.5 to 1:4.

25. A mixture according to claim 23, in which the mol ratio is approximately 1:2.

26. A process for dyeing or printing anionic dyeable substrates comprising applying a mixture according to claim 1, thereto as dyeing or printing agent.

27. A process according to claim 26, in which the substrate is a textile comprising natural or synthetic polyamides.

28. A process according to claim 26 wherein the mixture of compounds of formula Ia and Ib is employed in hard or salt-containing water in the absence of a water-softening agent.

* * * * *